US008555340B2

(12) United States Patent
Potter et al.

(10) Patent No.: US 8,555,340 B2
(45) Date of Patent: *Oct. 8, 2013

(54) METHOD AND APPARATUS FOR DETERMINING AUTHENTICATION CAPABILITIES

(75) Inventors: Darran Potter, Kent (GB); Jeremy Stieglitz, Menlo Park, CA (US); Andrew Clymer, Chippenha (GB)

(73) Assignee: Cisco Technology, Inc., San Jose, CA (US)

( * ) Notice: Subject to any disclaimer, the term of this patent is extended or adjusted under 35 U.S.C. 154(b) by 1359 days.

This patent is subject to a terminal disclaimer.

(21) Appl. No.: 11/655,646

(22) Filed: Jan. 18, 2007

(65) Prior Publication Data

US 2007/0118883 A1 May 24, 2007

Related U.S. Application Data

(63) Continuation of application No. 10/910,006, filed on Aug. 2, 2004, now Pat. No. 7,194,763.

(51) Int. Cl.
*G06K 9/00* (2006.01)
*G06F 17/30* (2006.01)
*H04L 9/00* (2006.01)
*H04L 9/32* (2006.01)

(52) U.S. Cl.
USPC ............ 726/3; 726/4; 726/6; 726/7; 713/151; 713/155; 713/168; 713/169; 713/182

(58) Field of Classification Search
USPC ........................................................... 726/3
See application file for complete search history.

(56) References Cited

U.S. PATENT DOCUMENTS

| 5,784,566 | A  | * | 7/1998 | Viavant et al. ................ 709/229 |
| 7,171,555 | B1 | * | 1/2007 | Salowey et al. ............... 713/156 |
| 7,194,763 | B2 | * | 3/2007 | Potter et al. ........................ 726/7 |
| 7,249,177 | B1 | * | 7/2007 | Miller ............................. 709/225 |
| 7,421,503 | B1 | * | 9/2008 | Stieglitz et al. ............... 709/229 |
| 7,673,146 | B2 | * | 3/2010 | Wiedmann et al. ........... 713/182 |
| 2003/0012382 | A1 | * | 1/2003 | Ferchichi et al. ............. 380/270 |
| 2004/0010713 | A1 | * | 1/2004 | Vollbrecht et al. ............ 713/201 |
| 2004/0093522 | A1 | * | 5/2004 | Bruestle et al. ............... 713/201 |

(Continued)

OTHER PUBLICATIONS

Bersani, F., et al, 'Deploying new Wireless Standards in Corporate Environments', France Telecom R&D, Apr. 2004, entire document, http://www.first.org/conference/2004/papers/c09.pdf.*

*Primary Examiner* — Edan Orgad
*Assistant Examiner* — Ronald Baum
(74) *Attorney, Agent, or Firm* — Hickman Palermo Truong Becker Bingham Wong LLP

(57) ABSTRACT

A method is disclosed for determining the authentication capabilities of a supplicant before initiating an authentication conversation with a client, for example, using Extensible Authentication Protocol (EAP). In one aspect, the method provides for sending, to a supplicant that is requesting access to a computer network subject to authentication of a user of the supplicant, a list of first authentication methods that are supported by an authentication server; receiving, from the supplicant, a counter-list of second authentication methods that are supported by the supplicant; determining how many second authentication methods in the counter-list match the first authentication methods; and performing an authentication policy action based on how many of the second authentication methods match the first authentication methods. Policy actions can include blocking access, re-directing to sources of acceptable authentication methods, granting one of several levels of network access, etc.

17 Claims, 7 Drawing Sheets

(56) References Cited

U.S. PATENT DOCUMENTS

2004/0208151 A1* 10/2004 Haverinen et al. ............ 370/338
2004/0268140 A1* 12/2004 Zimmer et al. ............... 713/200
2005/0021979 A1* 1/2005 Wiedmann et al. ........... 713/182
2005/0163078 A1* 7/2005 Oba et al. ...................... 370/331

* cited by examiner

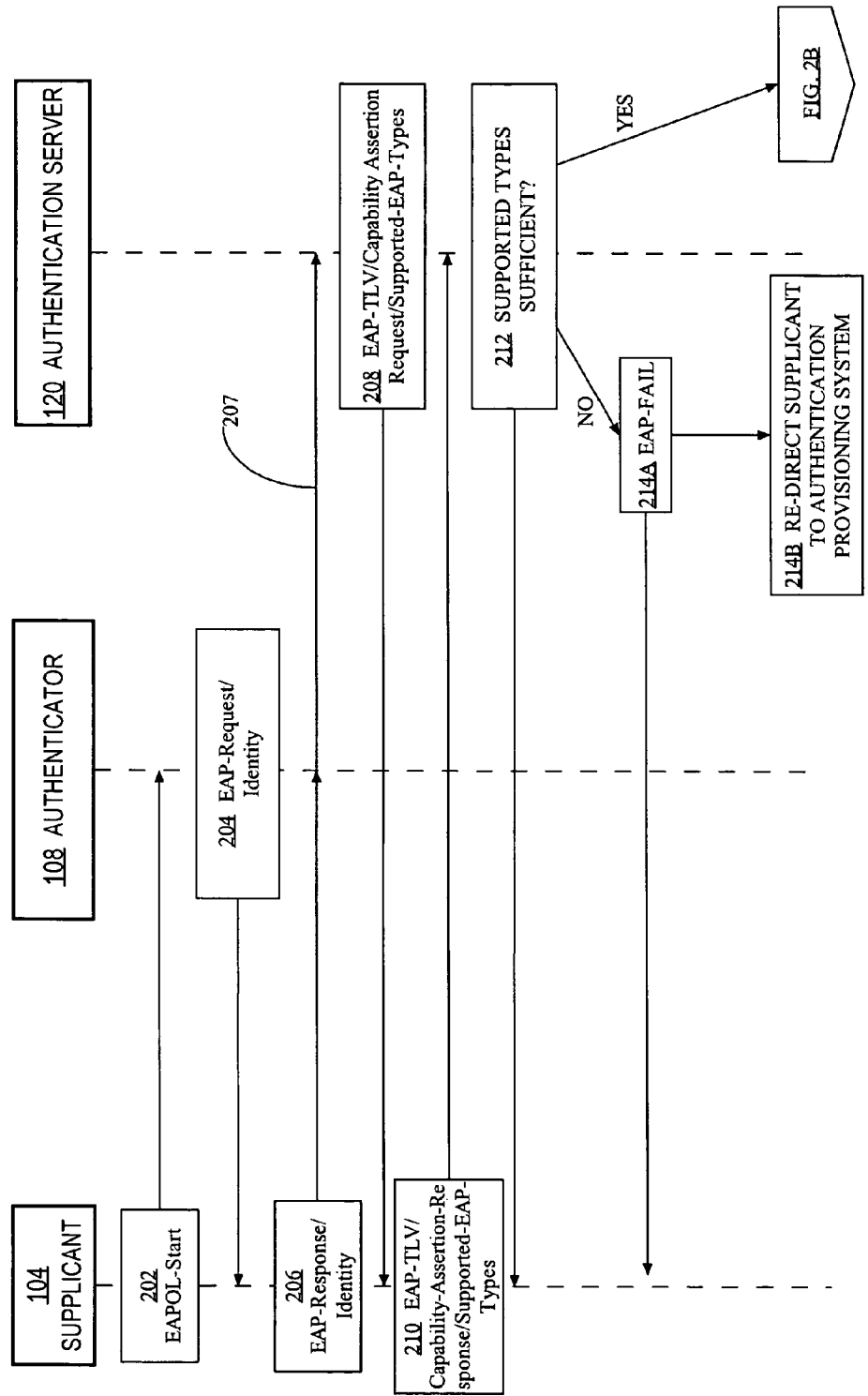

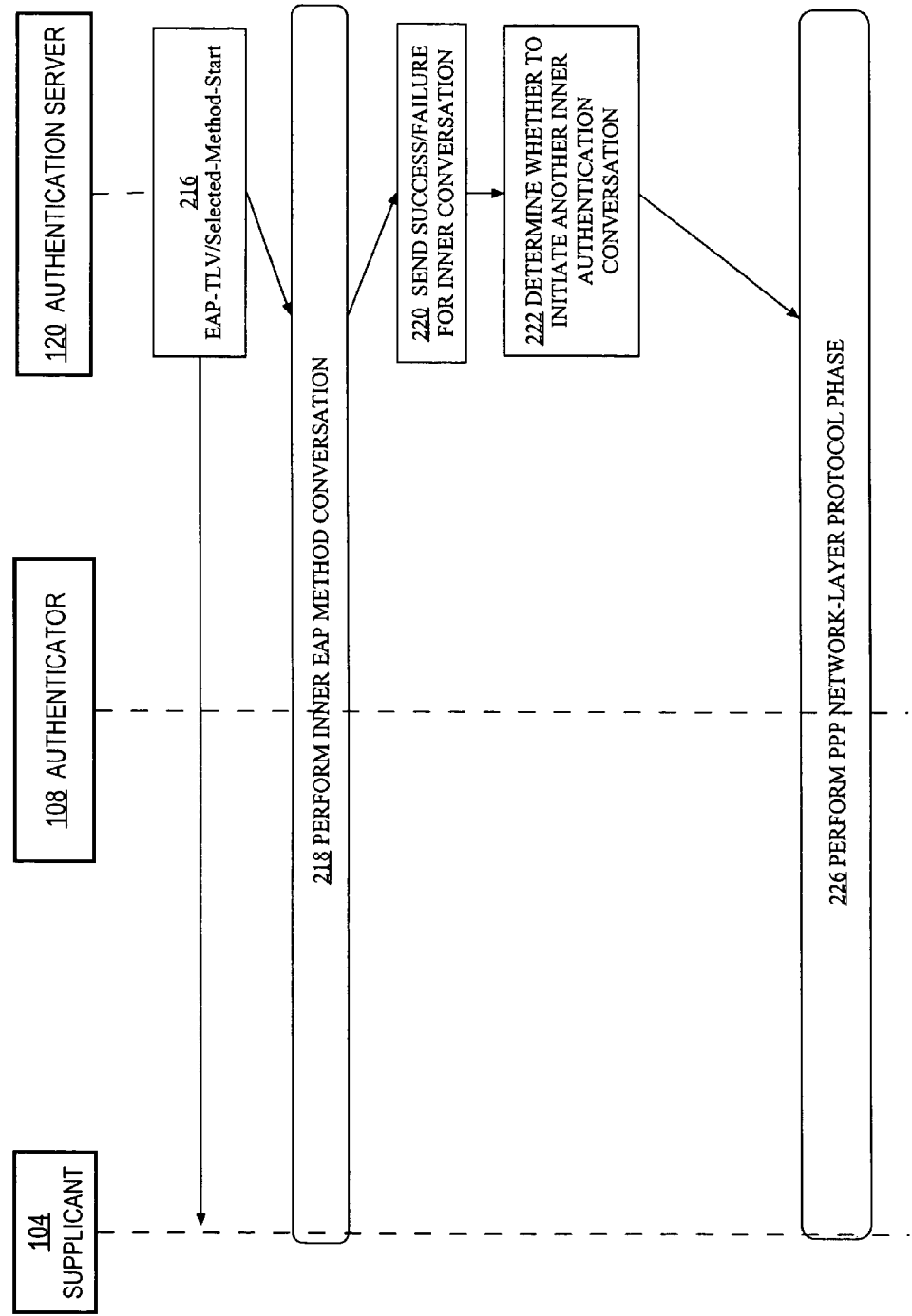

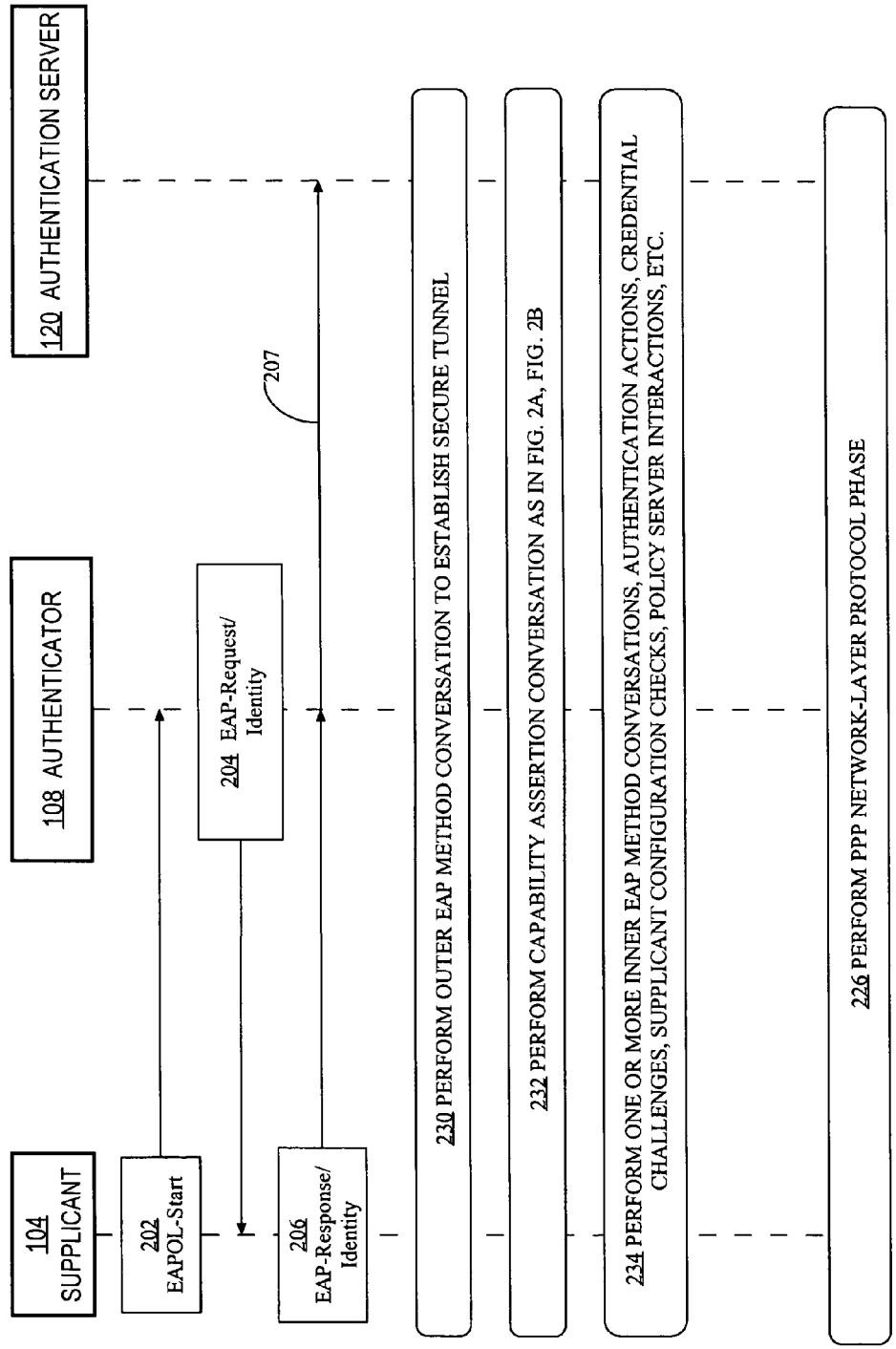

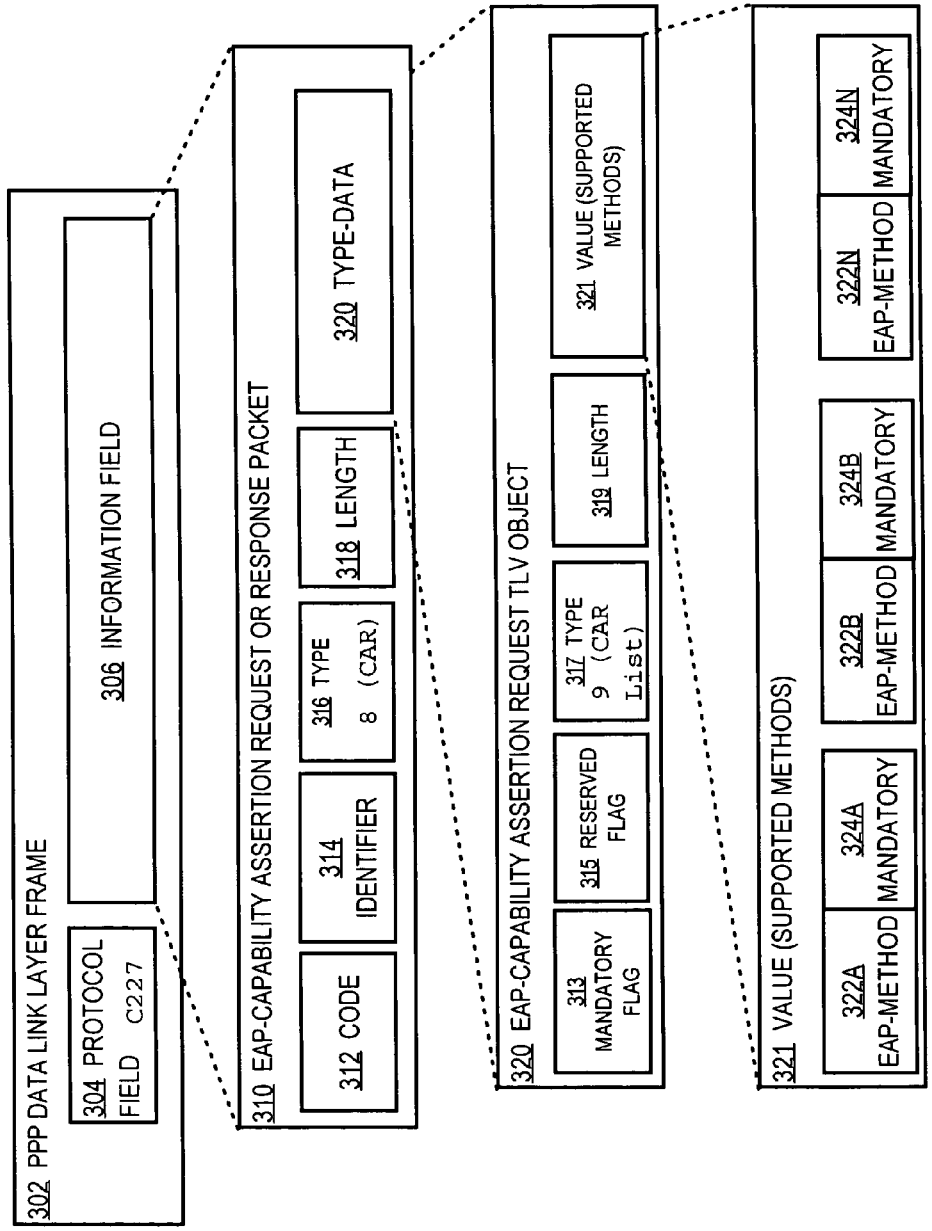

METHOD AND APPARATUS FOR DETERMINING AUTHENTICATION CAPABILITIES

RELATED APPLICATION

This application claims benefit as a Continuation of U.S. patent application Ser. No. 10/910,006, entitled "METHOD AND APPARATUS FOR DETERMINING AUTHENTICATION CAPABILITIES," filed Aug. 2, 2004 now U.S. Pat. No. 7,194,763 by Potter et al., the entire contents of which is hereby incorporated by reference as if fully set forth herein, under 35 U.S.C. §120.

FIELD OF THE INVENTION

The present invention generally relates to data processing in the field of user authentication in networks. The invention relates more specifically to a method and apparatus for determining authentication capabilities of a client or supplicant.

BACKGROUND OF THE INVENTION

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

A user authentication process is normally used in networks that carry data, voice or other information to determine whether a user or client seeking to access a network actually is who the user purports to be. Numerous message protocols have been developed to specify how to perform authentication with network devices such as switches, routers, gateways, and gatekeepers. Typically, an authentication protocol requires a client to prove its identity by offering a data credential that is verified in a secure manner by an authentication server. Some such servers also perform network access control and accounting functions and therefore are termed authentication, authorization and accounting (AAA) servers. A commercial example is CiscoSecure Access Control Server, from Cisco Systems, Inc.

The emergence of numerous diverse authentication protocols spurred a movement toward developing a generalized authentication protocol that could be extended to support various platforms and purposes. An authentication approach for network devices is described in L. Blunk et al., "PPP Extensible Authentication Protocol," IETF Request for Comments 2284, March 1998, and other aspects of EAP are described in RFC 2716, 3579, etc. The "EAP" approach of RFC 2284 provides a generalized way for a first network element to authenticate the identity of a second network element. EAP is becoming the preferred user authentication protocol for most types of network sessions across different network devices. In large part, this popularity stems from the extensible nature of EAP, which allows any device that provides generic support for the protocol to transparently support new authentication protocols, known as EAP methods.

EAP implementations have been developed for many specific contexts. For example, in the context of mobile wireless devices that use the Global System for Mobile communications (GSM), an approach for authentication and deriving session keys using the GSM Subscriber Identity Module (SIM) is described in H. Haverinen et al., "EAP SIM Authentication," IETF Internet-Draft, February 2003. In these contexts, EAP generally results in exchanging authentication credentials, and may include a key exchange in which peers acquire keys needed to decipher packets sent under a link layer protocol, such as IEEE 802.11.

Wireless local area networks such as those that use the 802.1x protocol for wireless communications now commonly use EAP for user authentication. A wireless client device, such as a laptop computer, that is seeking to obtain network access is termed a supplicant. An AAA server provides user authentication services to an access router that intercepts requests of the supplicant; the access router has the role of a client with respect to the AAA server.

EAP supplicants and servers are typically used in a relatively simple operational configuration in which one encrypted outer EAP method protects messages communicated using one inner EAP method. For example, the outer method may be EAP-PEAP and the inside method may comprise EAP GTC, in which the user uses a cryptographic token card to supply a user credential, or the inside method may comprise Microsoft Challenge-Authentication Protocol (MS-CHAP).

However, EAP sequences are becoming more widely deployed inside tunneled EAP methods, such as EAP-PEAPv2 and EAP-FAST, to provide authentication using more than one authentication factor, user authorization, validating that the supplicant has a required software configuration ("posture validation"), and other processes. These approaches introduce a greater burden on AAA servers, as these new methods require multiple cycles of challenge and response messages, and each message may require breaking into small fragments because they exceed the maximum transportable unit size of the transport medium (e.g., a WLAN) or transport protocol. Therefore, it is desirable not to burden an AAA server with a user authentication transaction unless it is relatively certain that the supplicant can perform as required in the transaction.

Further, new AAA server features may include more flexible policy-based access control. For example, authentication protocols no longer need to be statically pre-programmed into devices and supplicants. However, the whole authentication message sequence can fail at the last stage if the supplicant is not configured correctly. For this further reason, it is desirable not to initiate a message sequence if the supplicant cannot complete the sequence.

Type-length-value triplets (TLVs) are now used inside tunneled EAP methods to create sequences of EAP methods. This approach is required because the EAP specification states that top-level EAP methods cannot be chained. Hence an EAP method only receives an EAP-TLV, and a sequence of methods occurs conceptually "inside" the EAP-TLV exchange. As defined in RFC 2284, each EAP message includes a "Type" field, which indicates the EAP method being used for the authentication of the session. The Type field is required regardless of which encapsulation type is used to transport the EAP message, such as Remote Authentication Dial In User Service (RADIUS), which is defined in IETF RFC 2138; point-to-point protocol (PPP), as defined in RFC 1661; EAPOL, etc. EAP-TLV is EAP type 33. A protected version of EAP using TLS is also available, and is effectively the same as using a TLV inside EAP-PEAP or EAP-FAST.

Co-pending U.S. application Ser. No. 10/071,455, filed Feb. 8, 2002, claims a security capability negotiation in the context of SSL ciphersuites, and has the following abstract: "A method and apparatus are disclosed for providing data from a service to a client based on the encryption capabilities of the client. Cipher suite lists are exchanged between a client and an endpoint. On the endpoint, the cipher suite list incorporates a mapping of cipher suite names to services. The endpoint uses the client's list of cipher suites in conjunction with the mapping of cipher suite names to services to determine a cipher suite match. A service is selected based on the cipher suite match. A server farm is selected based on the service. The client is informed of this cipher suite match and the endpoint retains knowledge of the cipher suite match throughout the session. Therefore, the encrypted connection between the client and the endpoint can be disconnected and later reestablished to provide data from the particular server." Other handshake mechanisms and negotiation protocols have been used in other contexts, but they do not address the needs identified here.

Based on the foregoing, there is a clear need for an approach for determining the authentication capabilities of a supplicant before initiating a authentication process that may consume significant server resources. It would be useful to have such a mechanism that is compatible with existing protocol infrastructure in general, and compatible with EAP in particular.

BRIEF DESCRIPTION OF THE DRAWINGS

The present invention is illustrated by way of example, and not by way of limitation, in the figures of the accompanying drawings and in which like reference numerals refer to similar elements and in which:

FIG. 2A is a message flow diagram that illustrates a second example method of providing determining authentication capabilities;

FIG. 2B is a flow diagram that illustrates further steps and messages in the method of FIG. 2A;

FIG. 2C is a message flow diagram that illustrates a third example method of determining authentication capabilities;

FIG. 3 is a block diagram of a capability assertion request or response message;

DETAILED DESCRIPTION OF THE PREFERRED EMBODIMENT

Figure 1A:
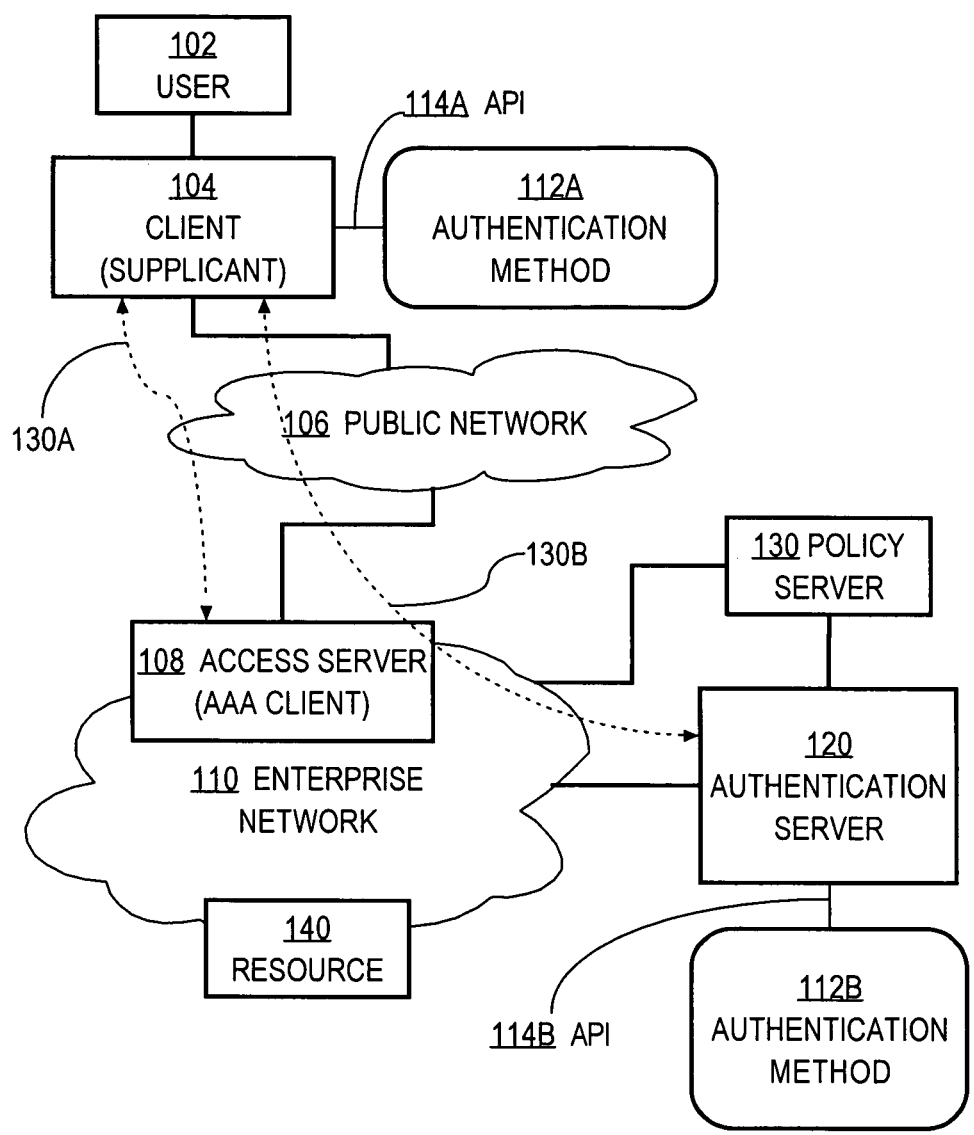
FIG. 1A is a block diagram that illustrates an example network arrangement in which an embodiment can be used.

A method and apparatus for providing multiple authentication types within an authentication protocol that supports a single type of authentication is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:

1.0 General Overview
2.0 Structural and Functional Overview
3.0 Extensible Authentication Protocol Implementation of Method of Determining Authentication Capabilities
    3.1 Process and Message Flow
    3.2 Using Multiple Authentication Types and Policy Rules
4.0 Implementation Mechanisms-Hardware Overview
5.0 Extensions and Alternatives 1.0 General Overview The needs identified in the foregoing Background, and other needs and objects that will become apparent for the following description, are achieved in the present invention, which comprises, in one aspect, a method for determining the authentication capabilities of a supplicant before initiating an authentication conversation with a client, for example, using Extensible Authentication Protocol (EAP). As an example, the method provides for sending, to a supplicant that is requesting access to a computer network subject to authentication of a user of the supplicant, a list of first authentication methods that are supported by an authentication server; receiving, from the supplicant, a counter-list of second authentication methods that are supported by the supplicant; determining how many second authentication methods in the counter-list match the first authentication methods; and performing an authentication policy action based on how many of the second authentication methods match the first authentication methods. Policy actions can include blocking access, re-directing to sources of acceptable authentication methods, granting one of several levels of network access, etc.

In one feature, the determining and performing steps comprise determining whether the counter-list identifies enough second authentication methods that match the first authentication methods, based on a policy applicable to the supplicant; and initiating an authentication conversation with the supplicant only when the counter-list identifies enough matching second authentication methods.

In another feature, the authentication policy action comprises sending an authentication failure message to the supplicant when the counter-list fails to identify enough matching second authentication methods. Additionally or alternatively, the authentication policy action comprises re-directing the supplicant to an authentication method provisioning system that contains one or more of the first authentication methods. In another embodiment, the authentication policy action comprises initiating an authentication conversation with the supplicant based on one of the first authentication methods that matches; and if the authentication conversation is successful, granting one of a plurality of levels of access to the computer network based on how many second authentication methods in the counter-list match the first authentication methods.

According to another feature, the authentication policy action comprises initiating a plurality of authentication conversations with the supplicant based on a plurality of the first authentication methods that match; determining respective results for each of the plurality of authentication conversations; and determining whether to grant access to one or more network resources based on results of each of the plurality of authentication conversations.

In yet another feature, determining whether to grant access comprises granting one of a plurality of levels of access to the computer network based on the results of the plurality of authentication conversations. The authentication conversations may comprise receiving and evaluating machine certificates, machine identity information, software or policy compliance information, machine or user governance information, or performing other user or machine credential checks. In still another feature, the authentication methods are Extensible Authentication Protocol (EAP) methods. The list of first authentication methods may be sent in an EAP type-length-value (TLV) request. The list of first authentication methods may comprise one or more octet pairs, wherein a first octet of an octet pair comprises a number of an EAP method, and a second octet comprises a mandatory flag. The first list may be an ordered list.

In still another feature, the method, further involves establishing, before performing the other steps, an outer EAP tunnel authentication conversation between the supplicant and the authentication server. Moreover, complex policy rules may define how to apply multiple authentication methods to a particular client or user, for example, based on the results of a determination of the authentication capabilities of the supplicant. As a result, a network can apply multiple levels of network access to a client or user based on whether the client or user succeeds in one, all, or multiple authentication processes.

In other aspects, the invention encompasses a computer apparatus and a computer-readable medium configured to carry out the foregoing steps.

2.0 Structural and Functional Overview

FIG. 1A is a block diagram that illustrates an example network arrangement in which an embodiment can be used. A user 102 is associated with a client 104 that is communicatively coupled to a public network 106 and indirectly communicatively coupled to an enterprise network 110. In the terminology of the RFC that describes EAP, a client system is termed a "supplicant," and in this description client 104 is such a supplicant. Client 104 may execute, for example, the 802.1x supplicant available from Microsoft. An access server 108, or AAA client, controls access to enterprise network 110, in cooperation with authentication server 120. The access server 108 is termed an AAA client because authentication server 120 services authentication requests of the access server.

Client 104 is any network-compatible end station, such as a personal computer or workstation. Network 106 may be any local area network, wide area network, or one or more internetworks. Enterprise network 110 is any network, including a WLAN, that holds one or more network resources 140 that client 104 is seeking to access. In certain embodiments, networks 106, 110 may be the same; thus, FIG. 1 is intended to broadly encompass any network arrangement in which an untrusted client 104 is seeking access to a resource 140 that is held in a secure network.

Access server 108 is, in one embodiment, a network router that is configured to perform access control functions. An example is Cisco Access Server AS5300, commercially available from Cisco Systems, Inc., San Jose, Calif. The EAP-compliant embodiments described herein may be implemented using any EAP-capable platform, including switches, routers, network elements that support VPN, wireless gateways, firewalls, etc.

Authentication server 120 is a server-class computer that is configured to securely store user authentication information such as usernames and passwords, and to perform authentication protocols, algorithms, and supporting processes, such as one-time password (OTP) validation, encryption and decryption, message digest evaluation, etc. In one embodiment, authentication server 120 communicates with access server 108 using a secure protocol that is optimized for use in authentication. An example of a suitable protocol is RADIUS.

Optionally a policy server 130 is communicatively coupled to network 110 and/or to authentication server 120, or is integrated with the authentication server. The policy server 130 provides a repository of authentication policies that the authentication server 120 may consult to determine how to interact with client 104. For example, policy server 130 may specify a minimum required authentication method that client 104 must be capable of using for authentication, a particular kind of credential that the client must present in addition to completing successful authentication, etc.

In this arrangement, client 104 must successfully authenticate itself to access server 108, in cooperation with authentication server 120, to gain access to resource 140. Any of several authentication protocols may be used to perform authentication. An example of a suitable authentication protocol is PEAP, which is an EAP-compliant protocol that is performed as part of establishing a PPP connection between client 104 and access server 108. In an object-oriented environment, logic that defines messages and actions performed as part of the authentication protocol can be structured as an authentication method 112A that client 104 accesses or calls using an application programming interface (API) 114A. A compatible authentication method 112B is callable by authentication server 120 using API 114B.

In general, under EAP, when client 104 attempts to access enterprise network 110, access server 108 contacts the client and requests identity information, which the client provides in a response. Thus, client 104 and access server 108 establish a logical connection 130A. Access server 108 then passes all subsequent messages involved in the authentication protocol, and issued by client 104, to authentication server 120, and forwards related messages directed from the authentication server to the client. Accordingly, client 104 and authentication server 120 effectively establish a logical connection 130B until the authentication protocol terminates. As a result, authentication server 120 can use authentication method 112B to determine its authentication behavior since it represents the logical endpoint of the authentication protocol conversation.

For purposes of illustrating a clear example, the following discussion of FIG. 1B, FIG. 2A-FIG. 2C, and FIG. 3 references communications among elements of FIG. 1A. However, FIG. 1A represents merely one example of a network arrangement, and the techniques described herein may be used in many other network arrangements.

Figure 1B:
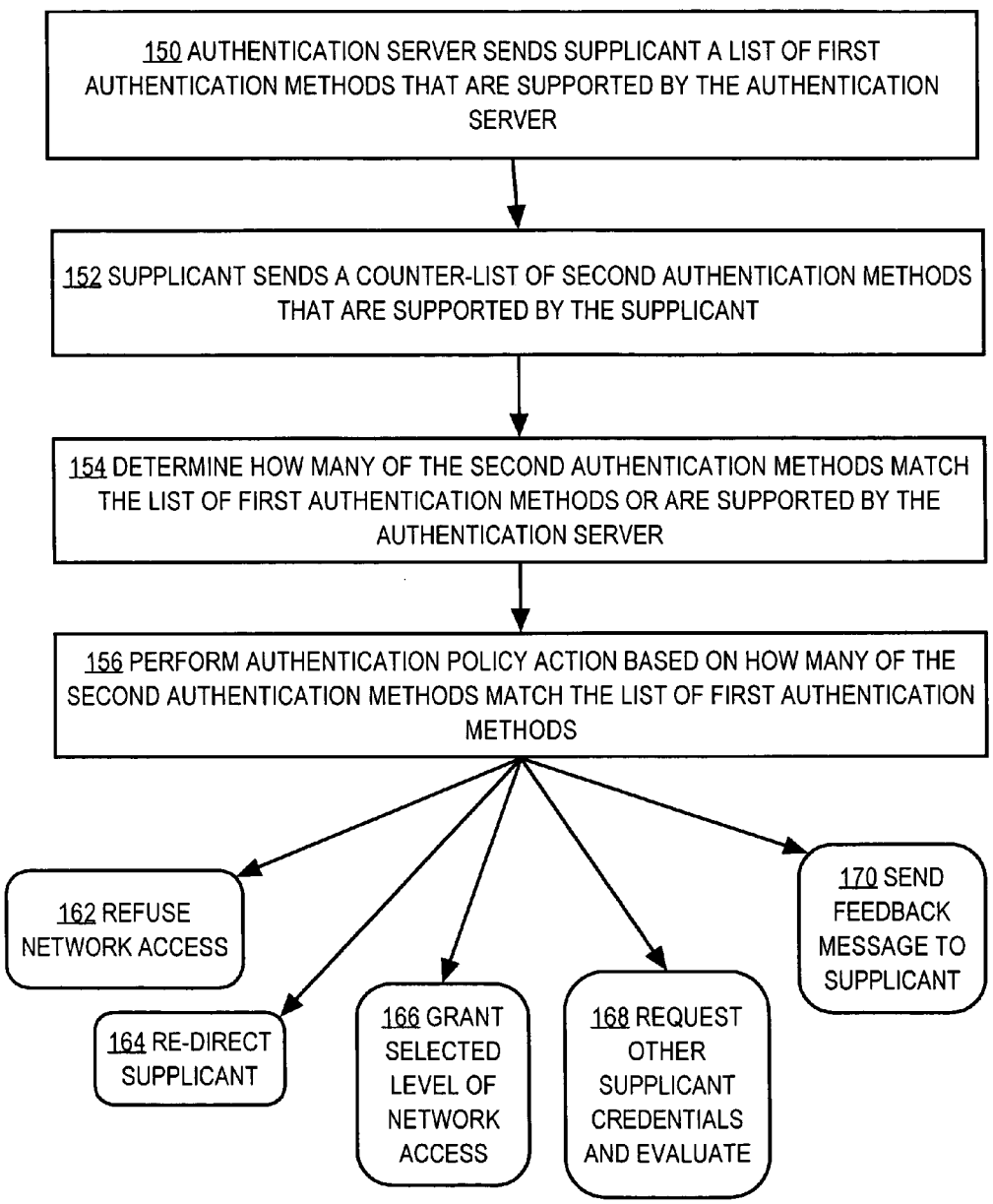
FIG. 1B is a flow diagram that shows an example method of determining authentication capabilities.

FIG. 1B is a flow diagram that shows an example method of determining authentication capabilities. In step 150, an authentication server sends a supplicant a list of first authentication methods that are supported by the authentication server. For example, in the context of FIG. 1A, authentication server 120 sends client 104 a list of EAP authentication method types that the authentication server supports or requires. Authentication server 120 may determine or form the contents of the list based on querying policy server 130 about authentication requirements for the client 104. In one embodiment, the list is ordered. Using an ordered list may provide certain performance enhancements. For example, ordering EAP credentials could serve to terminate, earlier, authentication requests that are certain to fail, and can possibly terminate such requests before the authentication server performs computational intensive operations such as computing public key values. However, using an ordered list is not required.

In step 152, the supplicant sends a counter-list of second authentication methods. The counter-list may comprise all authentication methods that are supported by the supplicant. Alternatively, the counter-list may comprise only those authentication methods that are supported by the supplicant and that are also in the list of first authentication methods supported by the authentication server, representing an intersection of lists maintained by the supplicant and authentication server.

In step 154, the authentication server determines how many of the second authentication methods match the list of first authentication methods or are supported by the authentication server. Thus, step 154 generally involves determining how the authentication capabilities asserted by the supplicant match the requirements of the authentication server. To perform step 154, authentication server 120 may compare its list to the list received from client 104, independently or using further consultation with the policy server 130.

In step 156, an authentication policy action is performed based on how many of the second authentication methods match the list of first authentication methods or are supported by the authentication server. Step 156 encompasses a variety of possible actions as shown, for example, in block 162, 164, 166, 168, and 170. Example actions may include refusing network access if the supplicant does not support a required authentication method (block 162). The authentication server may re-direct the supplicant to a network resource that contains one or more of the authentication methods that the authentication server requires, as in block 164, so that the supplicant can download and install the required authentication method.

Further, as shown in block 166, the authentication server 120 may instruct the access server 108 to grant a selected level of network access based on how well the authentication capabilities of the supplicant match requirements of the authentication server. For example, authentication server 120 can configure an access control list (ACL) of a particular type on access server 108 to limit what resources supplicant 104 can access. As shown in block 168, the authentication server may request and evaluate other credentials from the supplicant. The authentication server may determine which other credentials to request based on consultation with the policy server 130 or based on information about the user 102, client 104, location of the user or client, time of day, type of machine, type of connection, etc. Block 168 also may involve initiating a RADIUS conversation, performing an MS-CHAP challenge, etc.

Step 156 also may involve creating a log entry at the authentication server if the supplicant is determined not to support a required authentication method. In one embodiment, such log entries are specifically labeled as capability assertion failures. This technique makes the authentication server log easier for an administrator to interpret, as an administrator can to determine from the log that an authentication failure specifically occurred because of inadequate configuration of the supplicant.

Using this approach, policy negotiation of logins can be achieved. For instance, a user could request network access from a remote location or home location, on a work day or weekend, using a work-configured laptop or home machine, from a wired connection, wireless connection, VPN connection, etc. Based on information identifying these characteristics, policy server 130 or authentication server 120 can require the supplicant to present any of several different types of credentials, such as a machine identifier, token-card value, information about a software configuration of the user machine such as whether the user machine has antivirus software, a personal firewall, a particular operating system software image, certain required operating system security patches, etc. Thus, the approach disclosed herein facilitates complex policy negotiations involving one or more iterations, sequencing and timing to address myriad authentication scenarios and permutations that may be required according to various policies.

3.0 Extensible Authentication Protocol Implementation of Method of Determining Authentication Capabilities The preceding description of FIG. 1A, FIG. 1B is protocol independent. However, specific embodiments may implement the general techniques of FIG. 1A, FIG. 1B in the context of a specific authentication protocol, such as PEAP or any other EAP-compliant protocol.

3.1 Process and Message Flow

FIG. 2A is a message flow diagram that illustrates a second example method of providing determining authentication capabilities; FIG. 2B is a flow diagram that illustrates further steps and messages in the method of FIG. 2A. The processes of FIG. 2A, FIG. 2B show the general techniques of FIG. 1B applied in the EAP context.

Referring first to FIG. 2A, a supplicant 104, such as client 104 of FIG. 1A, initiates an EAP conversation by sending an EAP over LAN ("EAPOL") Start message 202 to access server 108, which has the role of an authenticator in FIG. 2A. Typically, EAPOL-Start message 202 is sent by supplicant 104 after the supplicant seeks to access a protected resource, such as resource 140, and receives a response from access server 108 indicating that access is denied.

The authenticator 108, which may be an edge router, firewall, gateway, or server, then issues an EAP-Request message 204 with subtype Identity. The message 204 operates as a request for the supplicant to identify itself. In response, supplicant 104 sends an EAP-Response message 206 with subtype Identity, and includes identifying information in a message attribute. For example, when the client is a mobile wireless device operating in a GSM network, the identifying information could be the user's International Mobile Subscriber Identity (IMSI) value or a temporary identity value. However, a separate identity exchange is not always required for EAP-SIM and AKA.

Authenticator 108 forwards message 206 to authentication server 120, as indicated by arrow 207. In response, authentication server 120 forms a Capability Assertion Request containing a list of supported EAP method types and sends the request to supplicant 104, as shown in step 208. Authentication server 120 may determine the specific method types that are contained in the Capability Assertion Request by querying policy server 130 for authentication policies applicable to supplicant 104 based, for example, on the identity information received from the supplicant.

In one embodiment, the Capability Assertion Request is carried within an EAP type-length-value ("TLV") attribute. EAP TLVs are described in T. Hiller et al., "A Container Type for the Extensible Authentication Protocol (EAP)," IETF internet-draft "<draft-hiller-eap-tlv-01.txt>" of May 2003. If additional security is desired, then alternatively, the Capability Assertion Request is carried in a protected EAP TLV. The use of EAP protected TLV attributes is described in J. Salowey, "Protected EAP TLV," March 2003, available at the time of this writing in the document draft-salowey-eap-protectedtlv-01.txt at the internet-drafts directory of the IETF.org domain on the World Wide Web.

FIG. 3 is a block diagram of a capability assertion request or response message, according to one embodiment, which can be used in an EAP embodiment over PPP. A PPP data link layer frame 302 comprises, among other data, a protocol field 304 and an information field 306. A value of hexadecimal "C227" in protocol field 304 signals that PEAP is in use and that information field 306 contains an EAP-compliant packet. Information field 306 carries an EAP-Capability Assertion request or response packet 310 having a Code field 312, Identifier field 314, Type field 316, Length field 318, and Type-data field 320. As provided in conventional EAP request or response packets, Code field 312 specifies whether the packet represents a Request or Response. Identifier field 314 stores a sequence number or similar value that aids in matching responses with requests. Length field 318 indicates the length of the EAP packet including all fields Unlike conventional PEAP or other EAP-compliant protocols, according to an embodiment, the Type field 316 carries a value specifying that multiple authentications is in use. Any value that uniquely identifies multiple authentications may be used. IETF RFC 2284 defines Type values 1 through 6, and other later RFCs may define other Type values; thus, a Type value other than those previously defined should be selected. As an example, in FIG. 3 a Type value of "8" indicates that the packet is a Capability Assertion Request according to the techniques herein.

Further, unlike conventional PEAP or other EAP-compliant protocols, according to an embodiment, the Type-Data field 320 carries a value that is structured as an EAP-compliant TLV object. The TLV object 320 comprises Mandatory flag 313, Reserved flag 315, Type value 317, Length field 319, and Value field 321. The Mandatory flag 313 indicates whether processing the TLV object 320 is mandatory and normally always has a value of "1" to indicate mandatory processing. The Reserved flag 315 is reserved for future use in the EAP specifications and is undefined for the techniques herein. The Type value 317 carries a value indicating that the TLV object is a list of supported authentication methods for a Capability Assertion Request. The Length field 319 indicates the length of the Value field 321.

Value field 321 comprises a list of octet pairs that identify authentication methods. As an example, in a first octet pair, a first octet 322A specifies an EAP method type using a value from 0 to 255, and a Mandatory octet 324A carries a flag value indicating whether support for the associated EAP type is mandatory. For example, a value of "1" indicates mandatory use. There may be any number of octet pairs in the Value field 321. The octet pairs may be ordered according to an order of priority of support by a supplicant.

Referring again to FIG. 2A, in step 210 the supplicant 104 replies to message 208 by forming and sending to the authentication server 120 an EAP-TLV Capability Assertion Response that contains a list of EAP method types that are supported by the supplicant. Optionally, step 210 may further involve the supplicant 104 prompting the user 102 to specify which EAP method the user wishes to use in interacting with the authentication server 120, receiving user input selecting of a method, and forming a Capability Assertion Response that identifies the selected method.

In step 212, the authentication server 120 performs any of the authentication policy actions described above with respect to FIG. 1B, step 156 and blocks 162-170. As an example, in FIG. 2A, step 212 comprises determining whether the supported EAP method types identified in message 210 are sufficient. If not, then authentication server 120 sends an EAP-FAIL message 214A to supplicant 104. Thus, the authentication server can immediately reject the authentication transaction if the supplicant is not configured adequately. Because the supplicant already knows the EAP methods that it was asked for but could not support, software or processes at the supplicant can generate user interface messages, create log entries, or perform other user feedback actions that give the user 102 a better understanding about why authentication failed than is available in prior approaches. For example, in a Windows XP environment, authentication failure can result in supplicant 104 presenting a pop-up message to user 102 in the Windows system tray area.

Additionally, authentication server 120 may re-direct the supplicant to an authentication provisioning system, as shown in step 214B. An authentication provisioning system may be provided in the network arrangement of FIG. 1A to provide a source for the supplicant 104 to download one or more authentication methods that the authentication server 120 requires but that are not currently supported by the supplicant. After downloading the required methods, the supplicant can attempt authentication again.

If the test of step 212 has a positive result, then control passes to FIG. 2B. In one embodiment, in step 216, the authentication server issues a Start message for a selected EAP authentication method in the list received in message 210. As a result, the supplicant and authentication server perform an inner EAP method conversation, step 218, using an EAP method selected from an intersection of the two lists respectively proposed by the authentication server and the supplicant.

In step 220, based on results of the conversation of step 218, the authentication server sends either a success or failure message to the supplicant 104. At step 222, the authentication server determines whether to initiate another inner authentication conversation. Step 222 may involve the authentication server 120 consulting policy information obtained from policy server 130 to determine whether additional authentication methods must be performed. Step 222 also may involve performing tests to determine whether the client has an acceptable security posture, including a particular type of required software, a required connection type, location, time of day for login, etc. (collectively termed "client posture validation").

At step 226, after all required EAP methods or other authentication checks are performed successfully, processing may continue with performing the PPP network-layer protocol phase, according to known techniques.

3.2 Using Multiple Authentication Types and Policy Rules

FIG. 2C is a message flow diagram that illustrates a third example method of determining authentication capabilities. Because EAP-TLV allows sequences of EAP types to be chained by wrapping them in a single outer type, the new EAP TLV Capability Assertion Request type defined herein can run either in the clear, outside a tunnel, and hence wrap all subsequent EAP methods, or inside a tunneled EAP method prior to other inner TLV types, or both.

For example, referring to FIG. 2C, in one embodiment, steps 202, 204, and 206 are performed as described above for FIG. 2A, and then as shown in step 230 a conventional outer EAP method conversation is performed to establish a secure tunnel between the supplicant 104 and the authentication server 120. Within the secure tunnel, in step 232 a capability assertion conversation is performed as shown in step 208 to step 222, inclusive, of FIG. 2A-FIG. 2B. Optionally, at step 234 one or more inner method conversations, authentication actions, credential challenges, supplicant configuration checks or posture validation, policy server interactions, etc., may be performed. Thus any number of authentication mechanisms may be chained together. When 802.1x is used, no network traffic can flow from the enterprise network to the supplicant until the entire chain completes successfully.

Embodiments may be used with a variety of inner and outer EAP authentication protocols. For example, one embodiment may use EAP-SIM authentication, as described in Haverinen et al. Alternatively, embodiments may use EAP-AKA authentication, which is described in J. Arkko, "EAP AKA Authentication," February 2003, available at the time of this writing in the document draft-arkko-pppext-eap-aka-09.txt, in directory Internet-Drafts of the IETF.org domain on the World Wide Web.

Thus, using one embodiment of the general techniques described herein, an AAA server sends, to the supplicant, an n-ordered list of EAP types that are supported or required by the server. The list is provided in a Capability Assertion Request (CAR). The supplicant responds with a list of EAP types for which it is configured, or that the end user has selected in response to a prompt, as its Capability Assertion Response. The AAA server and client negotiate, within an EAP-TLV dialog, an acceptable EAP type that meets requirements of the server. In effect, these techniques allow the AAA server to query the supplicant about its identity and capabilities before expending server resources on actually performing an authentication conversation. As a result, the techniques herein can result in fewer wasted server CPU cycles involved in processing authentication requests that ultimately will fail.

Further, various embodiments provide more intuitive feedback to the supplicant and end user; AAA server logs that are easier to interpret because Capability Assertion Request failures will be logged as such, enabling an administrator to specifically determine that an authentication failure occurred because of inadequate configuration of the supplicant; and convenient re-direction of the end user when insufficient credential matching occurs.

4.0 Implementation Mechanisms—Hardware Overview

Figure 4:
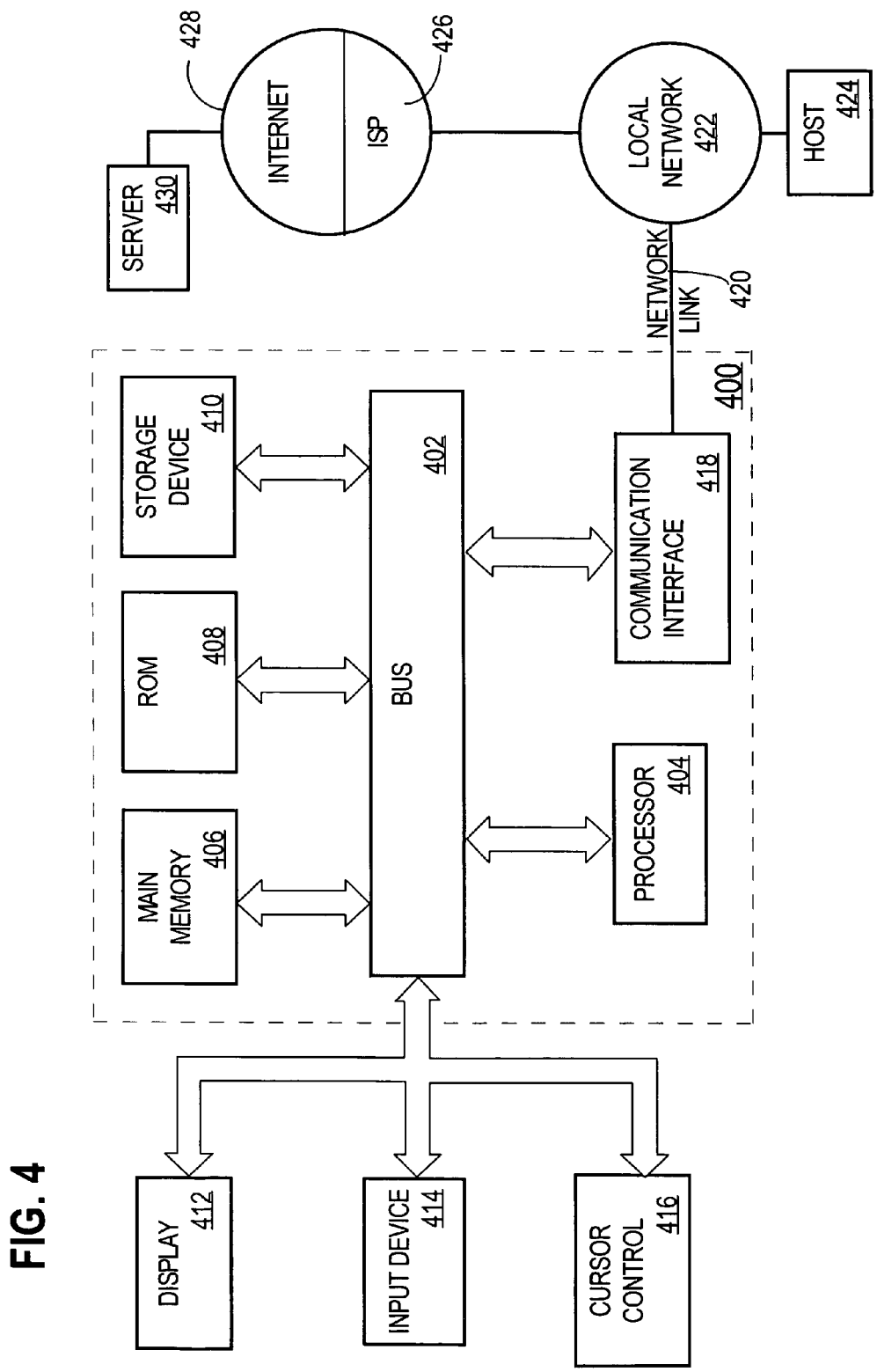
FIG. 4 is a block diagram that illustrates a computer system with which an embodiment may be implemented.

FIG. 4 is a block diagram that illustrates a computer system 400 upon which an embodiment of the invention may be implemented. Computer system 400 includes a bus 402 or other communication mechanism for communicating information, and a processor 404 coupled with bus 402 for processing information. Computer system 400 also includes a main memory 406, such as a random access memory ("RAM") or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory ("ROM") 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube ("CRT"), for displaying information to a computer user. An input device 414, including alphanumeric and other keys, is coupled to bus 402 for communicating information and command selections to processor 404. Another type of user input device is cursor control 416, such as a mouse, trackball, stylus, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

The invention is related to the use of computer system 400 for providing multiple authentication types within an authentication protocol that supports a single type. According to one embodiment of the invention, providing multiple authentication types within an authentication protocol that supports a single type is provided by computer system 400 in response to processor 404 executing one or more sequences of one or more instructions contained in main memory 406. Such instructions may be read into main memory 406 from another computer-readable medium, such as storage device 410. Execution of the sequences of instructions contained in main memory 406 causes processor 404 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 404 for execution. Such a medium may take many forms, including but not limited to, non-volatile media, volatile media. Non-volatile media includes, for example, optical or magnetic disks, such as storage device 410. Volatile media includes dynamic memory, such as main memory 406.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, or any other medium from which a computer can read.

Various forms of computer readable media may be involved in carrying one or more sequences of one or more instructions to processor 404 for execution. For example, the instructions may initially be carried on a magnetic disk of a remote computer. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network ("ISDN") card or a modem to provide a data communication connection to a corresponding type of telephone line. As another example, communication interface 418 may be a local area network ("LAN") card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider ("ISP") 426. ISP 426 in turn provides data communication services through the worldwide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

5.0 Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. An authentication server apparatus, comprising:
 a network interface that is coupled to a data network for receiving one or more packet flows therefrom;
 a processor;
 one or more stored sequences of instructions which, when executed by the processor, cause the processor to carry out the steps of:

sending via the network interface, to a supplicant that is requesting access to a computer network resource subject to authentication of a user of the supplicant, a list of first authentication methods that are supported by the authentication server;

wherein the first authentication methods are based on authentication requirements for the supplicant;

receiving via the network interface, from the supplicant, a counter-list of second authentication methods that are supported by the supplicant;

determining which of the second authentication methods in the counter-list are in the list of the first authentication methods; and performing an authentication policy action based on which of the second authentication methods are in the list of the first authentication methods;

initiating an authentication message exchange with the supplicant based on one of the first authentication methods that are in the counter-list of second authentication methods;

if the authentication message exchange is successful and the supplicant is granted access to the computer network resource, granting one of a plurality of levels of access to the computer network resource based on which of the second authentication methods in the counter-list are in the list of the first authentication methods.

2. An apparatus as recited in claim 1, wherein the sequences of instructions that cause the processor to perform the step of performing an authentication policy action comprise sequences of instructions which, when executed by the processor, cause the processor to perform re-directing the supplicant to an authentication method provisioning system that contains one or more of the first authentication methods.

3. An apparatus as recited in claim 1, wherein the sequences of instructions that cause the processor to perform the step of performing an authentication policy action comprise sequences of instructions which, when executed by the processor, cause the processor to perform:

initiating a plurality of authentication message exchanges with the supplicant based on a plurality of the first authentication methods that are in the counter-list of second authentication methods;

determining respective results for each of the authentication message exchanges;

determining whether to grant access to one or more network resources based on results of each of the authentication message exchanges.

4. An apparatus as recited in claim 3, wherein the sequences of instructions that cause the processor to perform the step of determining whether to grant access comprise sequences of instructions which, when executed by the processor, cause the processor to perform granting one of a plurality of levels of access to the computer network resource based on the results of the plurality of authentication message exchanges.

5. An apparatus as recited in claim 1, wherein the sequences of instructions that cause the processor to perform the step of sending from an authentication server via the network interface, to a supplicant that is requesting access to a computer network resource subject to authentication of a user of the supplicant, a list of first authentication methods that are supported by an authentication server comprise sequences of instructions which, when executed by the processor, cause the processor to perform:

sending from an authentication via the network interface, to the supplicant that is requesting access to the computer network resource subject to authentication of the user of the supplicant, a list of first Extensible Authentication Protocol (EAP) methods that are supported by the authentication server, in a Capability Assertion Request comprising one or more EAP type-length-value objects.

6. An apparatus as recited in claim 1, wherein the sequences of instructions that cause the processor to perform the step of receiving at the authentication server via the network interface, from the supplicant, a counter-list of second authentication methods that are supported by the supplicant comprise sequences of instructions which, when executed by the processor, cause the processor to perform:

receiving at the authentication server via the network interface, from the supplicant, the counter-list of second authentication methods that are supported by the supplicant, in a Capability Assertion Response comprising one or more Extensible Authentication Protocol (EAP) type-length-value (TLV) objects.

7. A non-transitory computer-readable storage medium carrying one or more sequences of instructions, which instructions, when executed by one or more processors, cause the one or more processors to perform the steps of:

sending from an authentication server via the network interface, to a supplicant that is requesting access to a computer network resource subject to authentication of a user of the supplicant, a list of first authentication methods that are supported by the authentication server;

wherein the first authentication methods are based on authentication requirements for the supplicant;

receiving at the authentication server via the network interface, from the supplicant, a counter-list of second authentication methods that are supported by the supplicant;

determining which of the second authentication methods in the counter-list are in the list of the first authentication methods; and performing an authentication policy action based on which of the second authentication methods are in the list of the first authentication method;

initiating an authentication message exchange with the supplicant based on one of the first authentication methods that are in the counter-list of second authentication methods;

if the authentication message exchange is successful and the supplicant is granted access to the computer network reesource, granting one of a plurality of levels of access to the computer network resource based on which of the second authentication methods in the counter-list are in the list of the first authentication methods.

8. A computer-readable storage medium as recited in claim 7, wherein the sequences of instructions that cause the processor to perform the step of performing an authentication policy action comprise sequences of instructions which, when executed by the processor, cause the processor to perform re-directing the supplicant to an authentication method provisioning system that contains one or more of the first authentication methods.

9. A computer-readable storage medium as recited in claim 7, wherein the sequences of instructions that cause the processor to perform the step of performing an authentication policy action comprise sequences of instructions which, when executed by the processor, cause the processor to perform:

initiating a plurality of authentication message exchanges with the supplicant based on a plurality of the first authentication methods that are in the counter-list of second authentication methods;

determining respective results for each of the authentication message exchanges;
determining whether to grant access to one or more network resources based on results of each of the authentication message exchanges.

10. A computer-readable storage medium as recited in claim 9, wherein the sequences of instructions that cause the processor to perform the step of determining whether to grant access comprise sequences of instructions which, when executed by the processor, cause the processor to perform granting one of a plurality of levels of access to the computer network resource based on the results of the plurality of authentication message exchanges.

11. A computer-readable storage medium as recited in claim 7, wherein the sequences of instructions that cause the processor to perform the step of sending from an authentication server via the network interface, to a supplicant that is requesting access to a computer network resource subject to authentication of a user of the supplicant, a list of first authentication methods that are supported by an authentication server comprise sequences of instructions which, when executed by the processor, cause the processor to perform:
sending from the authentication server via the network interface, to the supplicant that is requesting access to the computer network resource subject to authentication of the user of the supplicant, a list of first Extensible Authentication Protocol (EAP) methods that are supported by the authentication server, in a Capability Assertion Request comprising one or more EAP type-length-value objects.

12. A computer-readable storage medium as recited in claim 7, wherein the sequences of instructions that cause the processor to perform the step of receiving at the authentication server via the network interface, from the supplicant, a counter-list of second authentication methods that are supported by the supplicant comprise sequences of instructions which, when executed by the processor, cause the processor to perform:
receiving at the authentication server via the network interface, from the supplicant, the counter-list of second authentication methods that are supported by the supplicant, in a Capability Assertion Response comprising one or more Extensible Authentication Protocol (EAP) type-length-value (TLV) objects.

13. A method comprising the computer-implemented steps of:
sending from an authentication server via an network interface, to a supplicant that is requesting access to a computer network resource subject to authentication of a user of the supplicant, a list of first authentication methods that are supported by the authentication server;
wherein the first authentication methods are based on authentication requirements for the supplicant;
receiving at the authentication server via the network interface, from the supplicant, a counter-list of second authentication methods that are supported by the supplicant;
determining which of the second authentication methods in the counter-list are in the list of the first authentication methods; and performing an authentication policy action based on which of the second authentication methods are in the list of the first authentication method;
initiating an authentication message exchange with the supplicant based on one of the first authentication methods that are in the counter-list of second authentication methods;
if the authentication message exchange is successful and the supplicant is granted access to the computer network resource, granting one of a plurality of levels of access to the computer network resource based on which of the second authentication methods in the counter-list are in the list of the first authentication methods;
wherein the method is performed by one or more processors.

14. A method as recited in claim 13, wherein the step of performing an authentication policy action comprises re-directing the supplicant to an authentication method provisioning system that contains one or more of the first authentication methods.

15. A method as recited in claim 13, wherein the step of performing an authentication policy action comprises:
initiating a plurality of authentication message exchanges with the supplicant based on a plurality of the first authentication methods that are in the counter-list of second authentication methods;
determining respective results for each of the authentication message exchanges;
determining whether to grant access to one or more network resources based on results of each of the authentication message exchanges.

16. A method as recited in claim 13, wherein the step of sending from an authentication server via the network interface, to a supplicant that is requesting access to a computer network resource subject to authentication of a user of the supplicant, a list of first authentication methods that are supported by an authentication server comprises:
sending from the authentication server via the network interface via the network interface, to the supplicant that is requesting access to the computer network resource subject to authentication of the user of the supplicant, a list of first Extensible Authentication Protocol (EAP) methods that are supported by the authentication server, in a Capability Assertion Request comprising one or more EAP type-length-value objects.

17. A method as recited in claim 13, wherein the step of receiving at the authentication server via the network interface, from the supplicant, a counter-list of second authentication methods that are supported by the supplicant comprises:
receiving at the authentication server via the network interface, from the supplicant, the counter-list of second authentication methods that are supported by the supplicant, in a Capability Assertion Response comprising one or more Extensible Authentication Protocol (EAP) type-length-value (TLV) objects.

* * * * *

UNITED STATES PATENT AND TRADEMARK OFFICE
CERTIFICATE OF CORRECTION

| | |
|---|---|
| PATENT NO. | : 8,555,340 B2 |
| APPLICATION NO. | : 11/655646 |
| DATED | : October 8, 2013 |
| INVENTOR(S) | : Darran Potter, Jeremy Stieglitz and Andrew Clymer |

It is certified that error appears in the above-identified patent and that said Letters Patent is hereby corrected as shown below:

In the claims:

COLUMN 14

Claim 7 line 46 delete "reesource" insert -- resource --

COLUMN 15

Claim 13 line 47 delete "an" in front of network interface insert -- a --

COLUMN 16

Claim 16 lines 40-41 delete first occurrence of the two consecutive occurrences of "via the network interface"

Signed and Sealed this
Twentieth Day of May, 2014

Michelle K. Lee
*Deputy Director of the United States Patent and Trademark Office*